US011099901B2

(12) United States Patent
Chen et al.

(10) Patent No.: US 11,099,901 B2
(45) Date of Patent: Aug. 24, 2021

(54) METHOD FOR RESOURCE ALLOCATION AND TERMINAL DEVICE

(71) Applicant: Guangdong Oppo Mobile Telecommunications Corp., Ltd., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 92 days.

(21) Appl. No.: 16/164,143

(22) Filed: Oct. 18, 2018

(65) Prior Publication Data
US 2019/0129757 A1 May 2, 2019

(30) Foreign Application Priority Data

Oct. 31, 2017 (CN) .......................... 201711043202.4

(51) Int. Cl.
*G06F 9/50* (2006.01)
*A63F 13/23* (2014.01)
(Continued)

(52) U.S. Cl.
CPC ............ *G06F 9/5027* (2013.01); *A63F 13/23* (2014.09); *A63F 13/35* (2014.09); *A63F 13/40* (2014.09); *A63F 13/80* (2014.09); *G06F 9/5011* (2013.01); *G06F 9/5016* (2013.01); *A63F 2300/1075* (2013.01); *A63F 2300/1081* (2013.01);
(Continued)

(58) Field of Classification Search
CPC ...... G06F 9/505; G06F 9/5011; G06F 9/5027; G06F 2209/508
See application file for complete search history.

(56) References Cited

U.S. PATENT DOCUMENTS 10,698,736 B2 * 6/2020 Chen ..................... G06F 11/302
10,824,470 B2 * 11/2020 Chen ................. H04M 1/72427
(Continued)

FOREIGN PATENT DOCUMENTS

CN 103617797 A 3/2014
CN 104731304 A 6/2015
(Continued)

OTHER PUBLICATIONS

Extended European search report issued in corresponding European application No. 18201248.4 dated Mar. 11, 2019.
(Continued)

*Primary Examiner* — Duy Khuong T Nguyen
(74) *Attorney, Agent, or Firm* — Young Basile Hanlon & MacFarlane, P.C.

(57) ABSTRACT

A method for resource allocation and a terminal device are provided. The method includes the following. System-state information of a terminal device is acquired, and the terminal device has a target application running in a foreground of the terminal device. An internal running scenario of the target application is determined according to the system-state information. A performance improvement strategy corresponding to the internal running scenario is acquired. Allocation of system resources for the internal running scenario is adjusted according to the performance improvement strategy.

10 Claims, 8 Drawing Sheets

(51) Int. Cl.
  *A63F 13/35* (2014.01)
  *A63F 13/40* (2014.01)
  *A63F 13/80* (2014.01)
  *G06F 3/0488* (2013.01)
  *G06F 3/16* (2006.01)

(52) U.S. Cl.
  CPC ........ *A63F 2300/53* (2013.01); *G06F 3/0488* (2013.01); *G06F 3/167* (2013.01)

(56) References Cited

U.S. PATENT DOCUMENTS

| | | | | |
|---|---|---|---|---|
| 2010/0287011 | A1* | 11/2010 | Muchkaev | H04W 4/24 |
| | | | | 379/93.13 |
| 2011/0310751 | A1* | 12/2011 | Song | G06F 9/50 |
| | | | | 370/252 |
| 2012/0159090 | A1 | 6/2012 | Andrews et al. | |
| 2014/0267429 | A1 | 9/2014 | Justice et al. | |
| 2015/0222239 | A1* | 8/2015 | Zhang | H04L 65/602 |
| | | | | 381/61 |
| 2017/0091346 | A1* | 3/2017 | Anderson | G06F 30/00 |
| 2017/0269906 | A1* | 9/2017 | Anderson | G06F 8/24 |
| 2017/0289341 | A1 | 10/2017 | Rodriguez et al. | |
| 2018/0296922 | A1* | 10/2018 | Argintaru | A63F 13/50 |
| 2019/0034236 | A1* | 1/2019 | Cheng | G06F 9/505 |
| 2019/0129753 | A1* | 5/2019 | Chen | G06F 9/5011 |
| 2020/0272518 | A1* | 8/2020 | Chen | G06F 9/547 |

FOREIGN PATENT DOCUMENTS

| | | |
|---|---|---|
| CN | 104991775 A | 10/2015 |
| CN | 106020987 A | 10/2016 |
| CN | 106933328 A | 7/2017 |
| CN | 107300970 A | 10/2017 |
| CN | 108037999 A | 5/2018 |
| EP | 2874063 A2 | 5/2015 |
| WO | 2010084479 A2 | 7/2010 |

OTHER PUBLICATIONS

International search report issued in corresponding international application No. PCT/CN2018/105499 dated Dec. 5, 2018.
English translation of the third office action issued in corresponding CN application No. 201711043202.4 dated Apr. 1, 2020.
English translation of the Rejection issued in corresponding CN application No. 201711043202.4 dated Jul. 2, 2020.
Examination report issued in corresponding in application No. 201814039910 dated Jul. 22, 2020.
Communication pursuant to Article 94(3) EPC issued in corresponding European application No. 18201248.4 dated Jul. 13, 2020.
Summons to attend oral proceedings pursuant to Rule 115(1) EPC for EP Application 18201248.4 dated Mar. 11, 2021. (13 pages).

* cited by examiner

Android system

METHOD FOR RESOURCE ALLOCATION AND TERMINAL DEVICE

CROSS-REFERENCE TO RELATED APPLICATION(S)

This application claims priority to Chinese Patent Application No. 201711043202.4, filed on Oct. 31, 2017, the content of which is hereby incorporated by reference in its entirety.

TECHNICAL FIELD

This disclosure relates to the field of terminal device technology, and particularly to a method for resource allocation and a terminal device.

BACKGROUND

With the rapid development of technologies relating to terminal devices, an increasing number of applications are installed in mobile phones of users, such as reading applications, payment applications, game applications, music applications, and the like. People's daily life is closely linked with the mobile phones.

SUMMARY

Implementations of the disclosure provide a method for resource allocation.

According to a first aspect of the implementations of the disclosure, a method for resource allocation is provided. The method is applicable to a terminal device. An operating system and at least one application run in the terminal device. The method includes the following.

The operating system acquires system-state information of the terminal device, where the system-state information is state information of the terminal device that can be detected by the operating system and the terminal device has a target application running in a foreground of the terminal device. The operating system determines an internal running scenario of the target application according to the system-state information. The operating system acquires a performance improvement strategy corresponding to the internal running scenario. The operating system adjusts allocation of system resources for the internal running scenario according to the performance improvement strategy.

According to a second aspect of the implementations of the disclosure, a terminal device is provided, where the terminal device includes at least one processor and a computer readable storage coupled to the at least one processor. The computer readable storage is configured to store at least one computer executable instruction thereon which, when executed by the at least one processor, cause the at least one processor to carry out following actions.

System-state information of the terminal device is acquired by an operating system of the terminal device. The system-state information is state information of the terminal device that can be detected by the operating system and the terminal device has a target application running in a foreground of the terminal device. An internal running scenario of the target application is determined by the operating system according to the system-state information. A performance improvement strategy is acquired by the operating system corresponding to the internal running scenario. Allocation of system resources for the internal running scenario is adjusted by the operating system according to the performance improvement strategy.

According to a third aspect of the disclosure, there is provided a non-transitory computer-readable storage medium storing a computer program which, when executed by a processor, cause the processor to carry out following actions.

System-state information of the terminal device is acquired by an operating system of a terminal device. The system-state information is state information of the terminal device that can be detected by the operating system and the terminal device has a target application running in a foreground of the terminal device. An internal running scenario of the target application is determined by the operating system according to the system-state information. A performance improvement strategy is acquired by the operating system corresponding to the internal running scenario. Allocation of system resources for the internal running scenario is adjusted by the operating system according to the performance improvement strategy.

BRIEF DESCRIPTION OF THE DRAWINGS

The following briefly introduces the accompanying drawings required for describing the implementations.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices, in-vehicle devices, wearable devices, computing devices that have wireless communication functions or other processing devices connected to the wireless scenario, as well as various forms of user equipments (UE), mobile stations (MS), terminal devices, and the like. For the convenience of description, the above-mentioned devices are collectively referred to as a terminal device. An operating system related to the implementations of the disclosure is a software system that manages hardware resources uniformly and provides a user with a service interface.

Figure 1A:
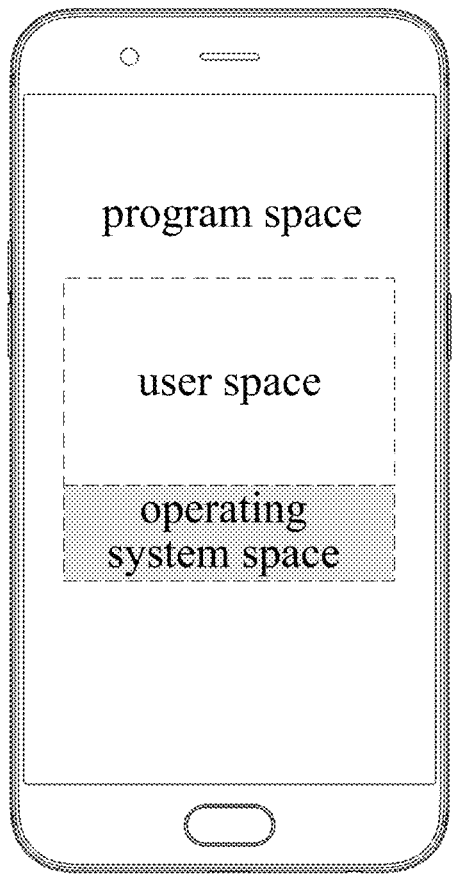
FIG. 1A is a schematic diagram illustrating a program space for running programs of a smart phone.
Figure 1B:
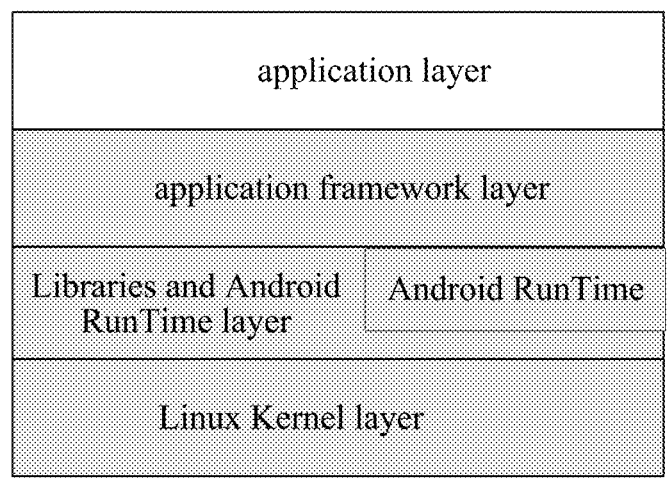
FIG. 1B is a schematic diagram illustrating a system architecture of an Android system.

As illustrated in FIG. 1A, a terminal device such as a smart phone generally has a program space for running programs. The program space includes a user space and an operating system space (that is, a place to install the operating system). One or more applications, which are target applications installed on the terminal device, can run in the user space. An operating system of the terminal device runs in the operating system space. Examples of the operating system include but are not limited to an Android® system, a mobile operating system iOS® developed by Apple®, etc. As illustrated in FIG. 1B, the following describes the Android system runs on the terminal device as an example. In the case of Android system, the user space includes an application layer of the Android system and the operating system space includes an application framework layer, Libraries and Android RunTime layer, and Linux Kernel layer of the Android system. The application layer includes various applications directly interacting with a user, or service programs written in the Java language and running in the background, for example, programs for implementing common basic functions on smart phones, such as short messaging service (SMS), telephone dialing, picture viewers, calendars, games, maps, world wide web (Web) browsers, etc., as well as other applications developed by developers. The application framework layer provides a series of libraries required in developing Android applications, which can be used to reuse components as well as personalize extensions through inheritance. The Libraries and Android RunTime layer can support the application framework and provide services for various components in the Android system. The Libraries and Android RunTime layer is consist of Libraries and Android RunTime. The Android RunTime includes a core library and a Dalvik virtual machine. The Linux kernel layer is configured to implement core functions such as hardware device driving, process and memory management, network protocol stacks, power management, wireless communication, and the like.

In general design, the target application runs in the user space. When the target application needs to perform operations such as sending data, reading disk data, and the like, standard interface functions provided by the operating system such as "write" and "send" should be invoked. That is, a central processing unit (CPU) invokes codes of the operating system space to achieve request operations of the user. The operating system of the terminal device generally improves allocation of system resources (such as increasing a clock rate of the CPU, etc.) as a whole to accelerate the target application.

In view of the above, implementations of the disclosure provide a method for resource allocation, aiming at the target application of the terminal device. With regard to the method, the operating system of the terminal device first acquires system-state information of the terminal device, where the terminal device has the target application running in a foreground of the terminal device. The operating system then determines an internal running scenario of the target application according to the system-state information. Thereafter, the operating system acquires a performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, which is beneficial to reducing signaling overheads between the target application and the operating system and improving refinement and efficiency of adjusting the allocation of the system resources for the target application by the terminal device.

The following describes the implementations of the disclosure in conjunction with the accompanying drawings.

Figure 2:
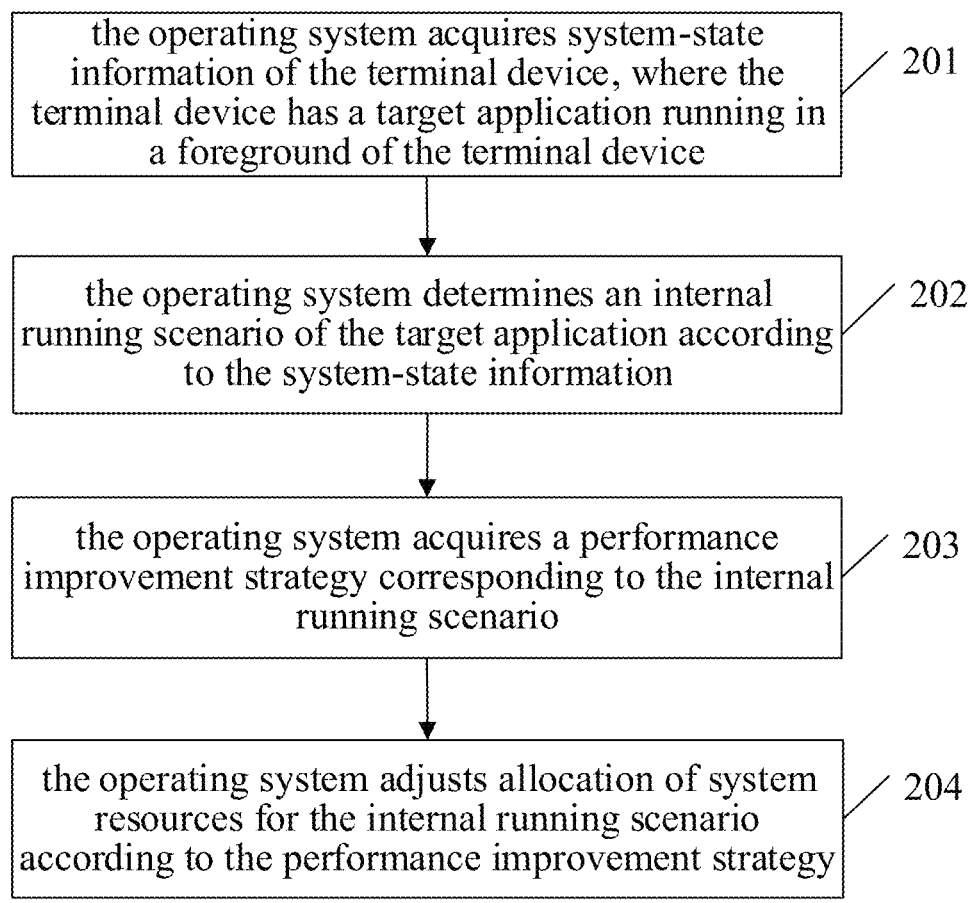
FIG. 2 is a schematic flow chart illustrating a method for resource allocation according to an implementation of the present disclosure.

FIG. 2 is a schematic flow chart illustrating a method for resource allocation according to an implementation of the present disclosure. The method is applicable to a terminal device. An operating system and at least one application run in the terminal device. The at least one application can include but not be limited to a photography application(s), a game application(s), a video application(s), an instant messaging application(s), and the like. As illustrated in FIG. 2, the method begins with operations at block 201.

At block 201, the operating system acquires system-state information of the terminal device. The system-state information refers to state information of the terminal device that can be detected by the operating system. The terminal device has a target application running in a foreground of the terminal device.

The system-state information is configured to describe state-information of the terminal device in a system level, including interaction information, a usage state of an internal device of the terminal device, and usage information of the system resources.

Examples of the target application may be a game application, a video application, an instant messaging application, and the like. The disclosure is not limited thereto.

At block 202, the operating system determines an internal running scenario of the target application according to the system-state information.

The internal running scenario can refer to subdivision running scenarios of the target application during running. For example, an internal running scenario of a game application can be divided into a starting scenario, a mall scenario, a team battle scenario, and the like according to running timing and function logic of the game application. The division strategy is not limited. The internal operation scenario can be preset, such as preset by a mobile phone developer, a game developer, or a user. The disclosure is not particularly restricted.

The team battle scenario in the game application can refer to a collective confrontation of several players in groups (such as in gangs, in teams, and the like).

At block 203, the operating system acquires a performance improvement strategy corresponding to the internal running scenario.

The performance improvement strategy can refer to an adjustment strategy of the system resources of the terminal device when the internal running scenario is running. As one implementation, the performance improvement strategy can include categories of system resources to be adjusted and an adjustment amount of the system resources of each category. The system resources may include at least one of: memory resources, central processing unit (CPU) resources, graphics processing unit (GPU) resources, display resources, network resources, and disk read/write IO (input/output) resources.

At block 204, the operating system adjusts allocation of system resources for the internal running scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. During running the target application in the foreground, the operating system of the terminal device can accurately identify the internal running scenario of the target application according to the system-state information and acquire the performance improvement strategy corresponding to the internal running scenario, as a result, the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

As one implementation, the system-state information includes interaction information. The operating system determines the internal running scenario of the target application according to the system-state information as follows. The operating system identifies the internal running scenario of the target application according to the interaction information.

The interaction information includes interaction information between the terminal device and the user, and interaction information with other devices. The disclosure is not limited herein.

As can be seen, in this implementation, the operating system can detect the interaction information directly, that is, the operating system does not have to receive scenario information from the target application first and then identify the internal running scenario. It is possible to reduce signaling overheads and improve efficiency of the allocation of the system resources for the internal running scenario of the target application.

As one implementation, the interaction information may include at least one of: touch parameters of a touch operation on a touch display screen of the terminal device, voice information collected by a microphone of the terminal device, and data information received by the terminal device from a server.

As one implementation, the target application is a game application and the internal running scenario is a team battle scenario. When the interaction information includes the touch parameters of the touch operation on the touch display screen of the terminal device, the operating system identifies the internal running scenario of the target application according to the interaction information as follows. The operating system determines that a current internal running scenario of the target application is the team battle scenario when detecting that at least one of the touch parameters is greater than a preset touch parameter.

The touch parameter may include a touch frequency, the number of touches, duration of the touch, or the like. The disclosure is not limited herein. The preset touch parameter may have a value of 50 times/second, 60 times/second, 100 times/second, or the like. The disclosure is not particularly restricted.

In this implementation, in the team battle scenario, the user needs to continuously operate a game character to play real-time game, so the touch parameters of the touch operation in this scenario will meet certain conditions. As the operating system of the terminal device can detect the touch operation directly, the operating system can directly determine that the internal running scenario of the game application is the team battle scenario according to the touch parameters. That is to say, the operating system can identify the team battle scenario without waiting for scenario information delivered by the game application. It is possible to reduce signaling overheads and improve efficiency of the allocation of the system resources for the team battle scenario of the game application.

As one implementation, the target application is a game application and the internal running scenario is a team battle scenario. When the interaction information includes the voice information collected by the microphone of the terminal device, the operating system identifies the internal running scenario of the target application according to the interaction information as follows. The operating system determines that the current internal running scenario of the target application is the team battle scenario when identifying that the voice information contains a preset key field.

The preset key field can refer to a key field that is strongly associated with the team battle scenario, such as "get together", "ready for team battle", and other exemplary fields.

In this implementation, since, in the team battle scenario, a player will enable the voice call function to realize real-time game communication, voice information of the player generally contains a key field(s) strongly associated with the team battle scenario. The operating system of the terminal device can detect the voice information collected by the microphone directly, thereby determining that the internal running scenario of the game application is the team battle scenario according to the voice information directly. That is to say, the operating system can identify the team battle scenario without waiting for scenario information delivered by the game application. It is possible to reduce signaling overheads and improve efficiency of the allocation of the system resources for the team battle scenario of the game application.

As one implementation, the target application is a game application and the internal running scenario is a team battle scenario. When the interaction information includes the data information received by the terminal device from the server, the operating system identifies the internal running scenario of the target application according to the interaction information as follows. The operating system determines that the current internal running scenario of the target application is the team battle scenario when identifying that the data information contains association information of a game character.

The association information of the game character can refer to data information associated with the game character in the team battle scenario, where the data information includes location information, action information (such as performing ability, running, jumping, etc.), state information (such as resurrection, blood volume, etc.), and the like. The disclosure is not particularly restricted herein.

In this implementation, in the team battle scenario, a terminal of the player can receive the data information from the server in real time and the data information contains information associated with the game character in the team battle scenario. The operating system of the terminal device can detect the data information from the server directly, thereby determining that the internal running scenario of the game application is the team battle scenario according to the data information directly. That is to say, the operating system can identify the team battle scenario without waiting for scenario information delivered by the game application. It is possible to reduce signaling overheads and improve efficiency of the allocation of the system resources for the team battle scenario of the game application.

As one implementation, the system-state information includes a usage state of an internal device of the terminal device. The operating system determines the internal running scenario of the target application according to the system-state information as follows. The operating system identifies the internal running scenario of the target application according to the usage state of the internal device of the terminal device.

As one implementation, the internal device includes a microphone. In another implementation, the internal device can further include a keyboard, a touch screen, and the like, which is not limited in the implementations of the present disclosure.

As one implementation, the target application is a game application and the internal running scenario is a team battle scenario. The operating system identifies the internal running scenario of the target application according to the usage state of the internal device of the terminal device as follows. The operating system determines that a current internal running scenario of the target application is the team battle scenario when detecting that a usage state of the microphone is an enabled state.

The usage state of the internal device includes an enabled state and a disabled state. In addition to the microphone, the internal device includes various sensors and other internal devices, such as an infrared sensor, an acceleration sensor, a gyroscope, and the like. The disclosure is not limited herein.

In this implementation, in the team battle scenario, the terminal of the player will enable a corresponding internal device according to scenario requirements of a current team battle scenario, for example, enable the microphone to achieve voice chat. The operating system of the terminal device can detect the usage state of the microphone, thereby determining that the internal running scenario of the game application is the team battle scenario according to the usage state directly. That is to say, the operating system can identify the team battle scenario without waiting for scenario information delivered by the game application. It is possible to reduce signaling overheads and improve efficiency of the allocation of the system resources for the team battle scenario of the game application.

As one implementation, the system-state information includes usage information of the system resources. The operating system determines the internal running scenario of the target application according to the system-state information as follows. The operating system identifies the internal running scenario of the target application according to the usage information of the system resources.

In this implementation, due to some specific amplitude changes in demands on the system resources for some certain internal running scenarios, such as a sudden increase or a sudden decrease in a data amount invoked, the operating system can identify the internal running scenario via detecting the usage information of the system resources. In this way, the target application does not need to send scenario information to the operating system, thereby reducing signaling overheads and improving refinement and efficiency of the allocation of the system resources for the internal scenario of the target application.

As one implementation, the usage information of the system resources includes a reading speed of disk data, and the disk data includes at least one of animation resources and audio resources. The target application is a game application and the internal running scenario is a team battle scenario. The operating system identifies the internal running scenario of the target application according to the usage information of the system resources as follows. The operating system determines that a current internal running scenario of the target application is the team battle scenario when detecting that an increase amount in a reading speed of the at least one of animation resources and audio resources is greater than a preset threshold.

In this implementation, as, in the team battle scenario of the game application, a large data amount of the animation resources and the audio resources needs to be invoked, the operating system can detect a surge of the reading speed of the disk data, thereby identifying the team battle scenario. That is to say, the operating system can directly identify the team battle scenario without waiting for scenario information delivered by the game application. In this way, signaling overheads can be reduced and efficiency of the allocation of the system resources for the team battle scenario of the game application can be improved.

As one implementation, the system resources may include at least one of: memory resources, central processing unit (CPU) resources, graphics processing unit (GPU) resources, display resources, network resources, and disk read/write IO (input/output) resources.

Figure 3A:
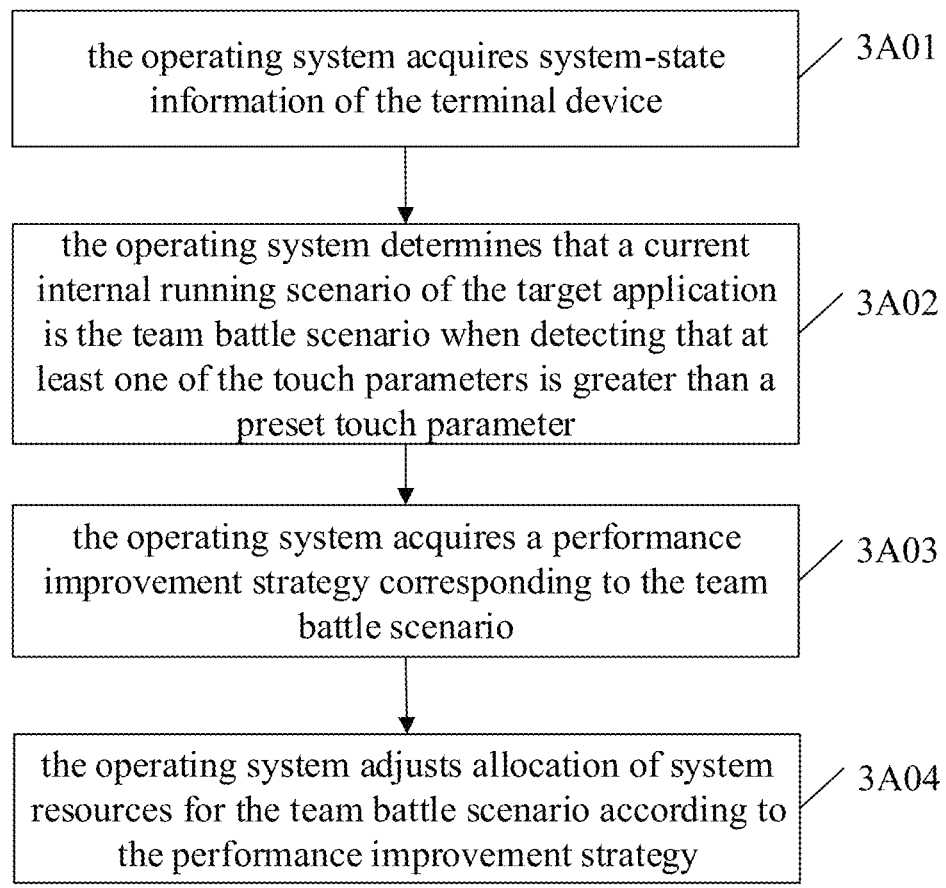
FIG. 3A is a schematic flow chart illustrating a method for resource allocation according to an implementation of the present disclosure.

Consistent with the implementations illustrated in FIG. 2, FIG. 3A is a schematic flow chart illustrating a method for resource allocation according to an implementation of the present disclosure. The method is applicable to a terminal device. An operating system and at least one application run in the terminal device. As illustrated in FIG. 3A, the method begins with operations at block 3A01.

At block 3A01, the operating system acquires system-state information of the terminal device, where the system-state information is state information of the terminal device that can be detected by the operating system and the terminal device has a target application running in a foreground of the terminal device. The system-state information includes interaction information and the interaction information is touch parameters of a touch operation on a touch display screen of the terminal device.

The target application is a game application and the internal running scenario is a team battle scenario.

At block 3A02, the operating system determines that a current internal running scenario of the target application is the team battle scenario when detecting that at least one of the touch parameters is greater than a preset touch parameter.

At block 3A03, the operating system acquires a performance improvement strategy corresponding to the team battle scenario.

At block 3A04, the operating system adjusts allocation of system resources for the team battle scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

Moreover, in the team battle scenario, the user needs to continuously operate a game character to perform real-time game, so the touch parameters of the touch operation in this scenario will meet certain conditions. As the operating system of the terminal device can detect the touch operation directly, the operating system can directly determine that the internal running scenario of the game application is the team battle scenario according to the touch parameters. That is to say, the operating system can directly identify the team battle scenario without waiting for scenario information delivered by the game application. It is possible to reduce signaling overheads and improve efficiency of the allocation of the system resources for the team battle scenario of the game application.

Figure 3B:
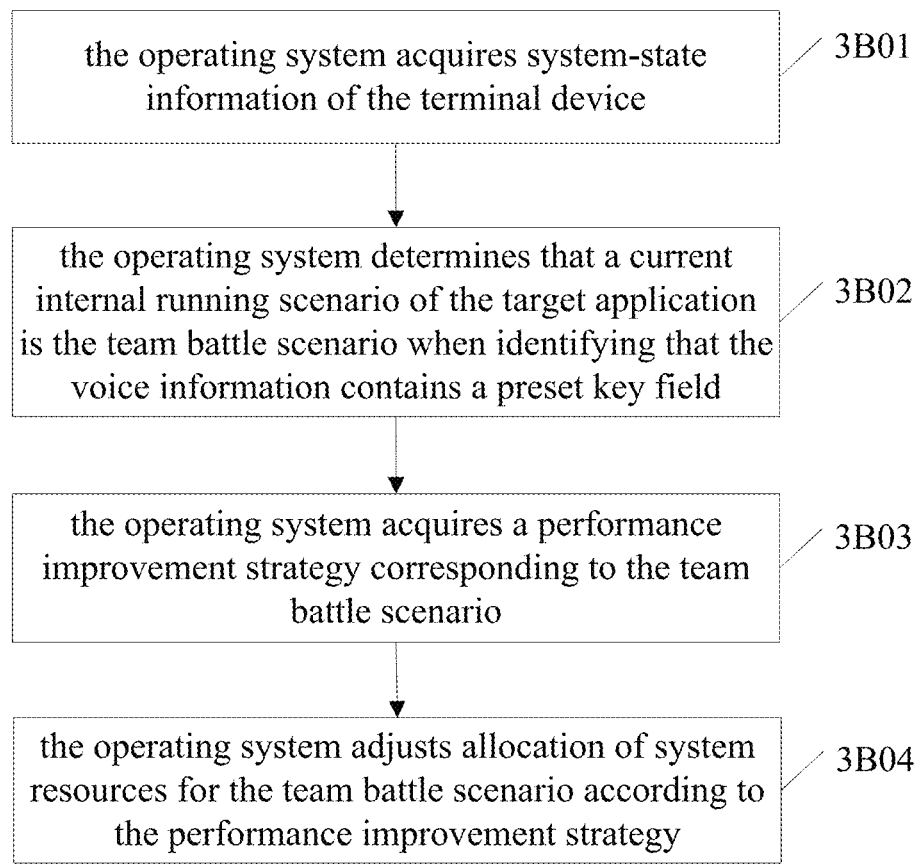
FIG. 3B is a schematic flow chart illustrating a method for resource allocation according to an implementation of the present disclosure.

Consistent with the implementations illustrated in FIG. 2, FIG. 3B is a schematic flow chart illustrating a method for resource allocation according to an implementation of the present disclosure. The method is applicable to a terminal device. An operating system and at least one application run in the terminal device. As illustrated in FIG. 3B, the method begins with operations at block 3B01.

At block 3B01, the operating system acquires system-state information of the terminal device, where the system-state information is state information of the terminal device that can be detected by the operating system and the terminal device has a target application running in a foreground of the terminal device. The system-state information includes interaction information and the interaction information is voice information collected by a microphone of the terminal device.

The target application is a game application and the internal running scenario is a team battle scenario.

At block 3B02, the operating system determines that a current internal running scenario of the target application is the team battle scenario when identifying that the voice information contains a preset key field.

At block 3B03, the operating system acquires a performance improvement strategy corresponding to the team battle scenario.

At block 3B04, the operating system adjusts allocation of system resources for the team battle scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. During running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

In this implementation, since, in the team battle scenario, a player will enable the voice call function to realize real-time game communication, voice information of the player generally contains a key field strongly associated with the team battle scenario. The operating system of the terminal device can detect the voice information collected by the microphone directly, thereby determining that the internal running scenario of the game application is the team battle scenario according to the voice information directly. That is to say, the operating system can identify the team battle scenario without waiting for scenario information delivered by the game application. It is possible to reduce signaling overheads and improve efficiency of the allocation of the system resources for the team battle scenario of the game application.

Figure 3C:
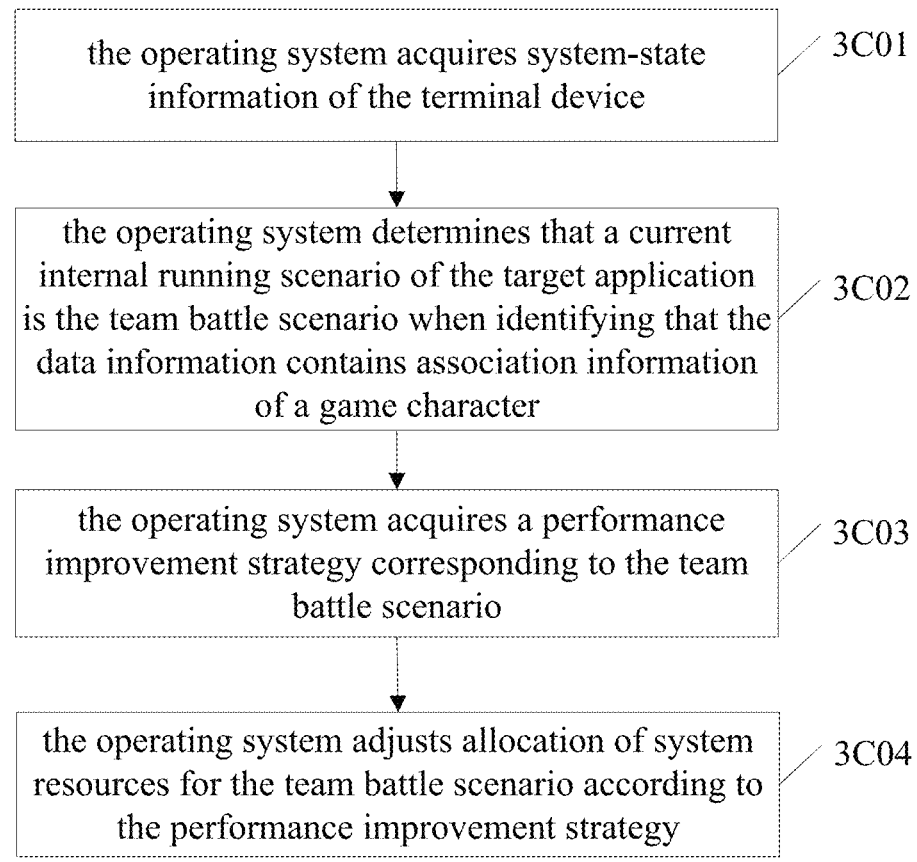
FIG. 3C is a schematic flow chart illustrating a method for resource allocation according to an implementation of the present disclosure.

Consistent with the implementations illustrated in FIG. 2, FIG. 3C is a schematic flow chart illustrating a method for resource allocation according to an implementation of the present disclosure. The method is applicable to a terminal device. An operating system and at least one application run in the terminal device. As illustrated in FIG. 3C, the method begins with operations at block 3C01.

At block 3C01, the operating system acquires system-state information of the terminal device, where the system-state information is state information of the terminal device that can be detected by the operating system and the terminal device has a target application running in a foreground of the terminal device. The system-state information includes interaction information and the interaction information is data information received by the terminal device from a server.

The target application is a game application and the internal running scenario is a team battle scenario.

At block 3C02, the operating system determines that a current internal running scenario of the target application is the team battle scenario when identifying that the data information contains association information of a game character.

At block 3C03, the operating system acquires a performance improvement strategy corresponding to the team battle scenario.

At block 3C04, the operating system adjusts allocation of system resources for the team battle scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario and consequently, the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

In this implementation, in the team battle scenario, a terminal of the player can receive the data information from the server in real time and the data information contains information associated with the game character in the team battle scenario. The operating system of the terminal device can detect the data information from the server directly, thereby determining that the internal running scenario of the game application is the team battle scenario according to the data information directly. That is to say, the operating system can identify the team battle scenario without waiting for scenario information delivered by the game application. It is possible to reduce signaling overheads and improve efficiency of the allocation of the system resources for the team battle scenario of the game application.

Figure 4:
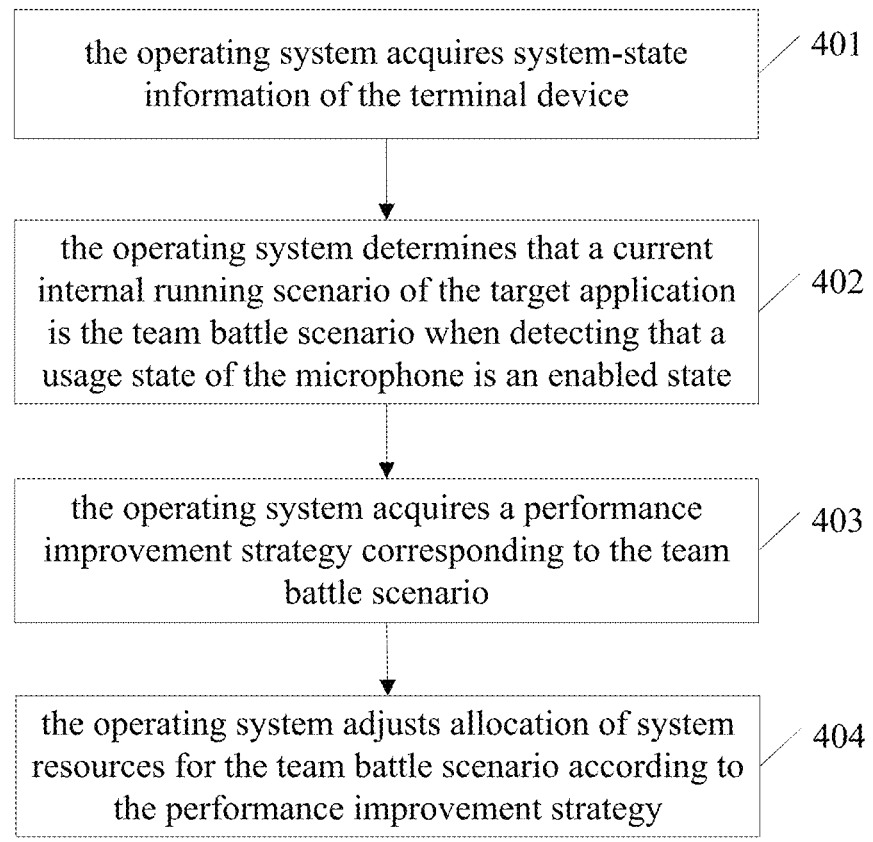
FIG. 4 is a schematic flow chart illustrating a method for resource allocation according to an implementation of the present disclosure.

Consistent with the implementations illustrated in FIG. 2, FIG. 4 is a schematic flow chart illustrating a method for resource allocation according to an implementation of the present disclosure. The method is applicable to a terminal device. An operating system and at least one application run in the terminal device. As illustrated in FIG. 4, the method begins with operations at block 401.

At block 401, the operating system acquires system-state information of the terminal device, where the system-state information is state information of the terminal device that can be detected by the operating system and the terminal device has a target application running in a foreground of the terminal device. The system-state information includes a usage state of an internal device of the terminal device, where the internal device includes a microphone.

The target application is a game application and the internal running scenario is a team battle scenario.

At block 402, the operating system determines that a current internal running scenario of the target application is the team battle scenario when detecting that a usage state of the microphone is an enabled state.

At block 403, the operating system acquires a performance improvement strategy corresponding to the team battle scenario.

At block 404, the operating system adjusts allocation of system resources for the team battle scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

In this implementation, in the team battle scenario, the terminal of the player will enable a corresponding internal device according to scenario requirements of a current team battle scenario, for example, enable the microphone to achieve voice chat. The operating system of the terminal device can detect the usage state of the microphone, thereby determining that the internal running scenario of the game application is the team battle scenario according to the usage state directly. That is to say, the operating system can identify the team battle scenario without waiting for scenario information delivered by the game application. It is possible to reduce signaling overheads and improve efficiency of the allocation of the system resources for the team battle scenario of the game application.

Figure 5:
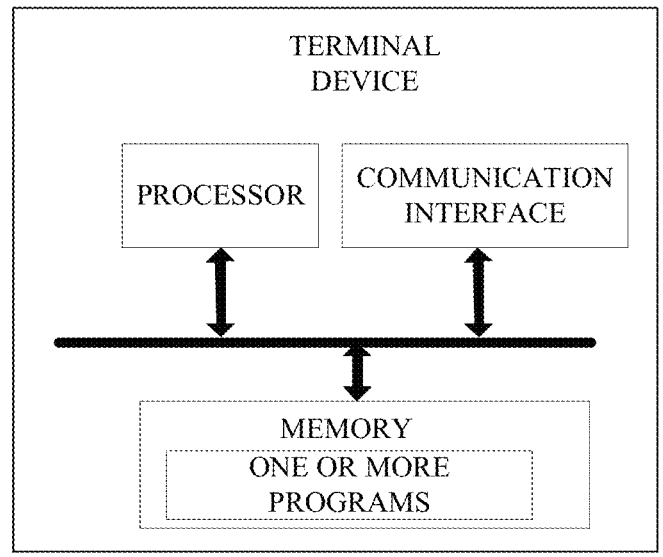
FIG. 5 is a schematic structural diagram illustrating a terminal device according to an implementation of the present disclosure.

Consistent with the implementations illustrated in FIG. 2 to FIG. 4, FIG. 5 is a schematic structural diagram illustrating a terminal device according to an implementation of the present disclosure. At least one application and an operating system run in the terminal device. As illustrated in FIG. 5, the terminal device includes a processor 501, a computer readable storage 502 such as a memory, and a communication interface 503. The memory is configured to store one or more programs which are different from the foregoing at least one applications. The one or more programs are configured to be executed by the processor 501 and include instructions operable to execute the following operations.

System-state information of the terminal device is acquired, where the system-state information is state information of the terminal device that can be detected by the operating system and the terminal device has a target application running in a foreground of the terminal device. An internal running scenario of the target application is determined according to the system-state information. A performance improvement strategy corresponding to the internal running scenario is acquired. Allocation of system resources for the internal running scenario is adjusted according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application of the terminal device.

As one implementation, the system-state information includes interaction information. The instructions of the programs operable to execute the determining an internal running scenario of the target application according to the system-state information are operable to execute the following.

The internal running scenario of the target application is identified according to the interaction information.

As one implementation, the interaction information includes at least one of: touch parameters of a touch operation on a touch display screen of the terminal device, voice information collected by a microphone of the terminal device, and data information received by the terminal device from a server.

As one implementation, the target application is a game application and the internal running scenario is a team battle scenario. When the interaction information includes the touch parameters of the touch operation on the touch display screen of the terminal device, in terms of the identifying the internal running scenario of the target application according to the interaction information, the instructions of the programs are operable to execute the following.

Determine that a current internal running scenario of the target application is the team battle scenario, when detecting that at least one of the touch parameters is greater than a preset touch parameter.

When the interaction information includes the voice information collected by the microphone of the terminal device, in terms of the identifying the internal running scenario of the target application according to the interaction information, the instructions of the programs are operable to execute the following.

Determine that the current internal running scenario of the target application is the team battle scenario when identifying that the voice information contains a preset key field.

When the interaction information includes the data information received by the terminal device from the server, in terms of the identifying the internal running scenario of the target application according to the interaction information, the instructions of the programs are operable to execute the following.

Determine that the current internal running scenario of the target application is the team battle scenario when identifying that the data information contains association information of a game character.

As one implementation, the system-state information includes a usage state of an internal device of the terminal device. The instructions of the programs operable to execute the determining an internal running scenario of the target application according to the system-state information are operable to execute the following.

The internal running scenario of the target application is identified according to the usage state of the internal device of the terminal device.

As one implementation, the internal device includes a microphone.

As one implementation, the target application is a game application and the internal running scenario is a team battle scenario.

As one implementation, in terms of the identifying the internal running scenario of the target application according to the usage state of the internal device of the terminal device, the instructions of the programs are operable to execute the following.

Determine that a current internal running scenario of the target application is the team battle scenario when detecting that a usage state of the microphone is an enabled state.

As one implementation, the system-state information includes usage information of the system resources. The instructions of the programs operable to execute the determining an internal running scenario of the target application according to the system-state information are operable to execute the following.

The internal running scenario of the target application is identified according to the usage information of the system resources.

As one implementation, the usage information of the system resources includes a reading speed of disk data, and the disk data includes at least one of animation resources and audio resources. The target application is a game application and the internal running scenario is a team battle scenario. In terms of the identifying the internal running scenario of the target application according to the usage information of the system resources, the instructions of the programs are operable to execute the following.

Determine that a current internal running scenario of the target application is the team battle scenario when detecting that an increase amount in a reading speed of the at least one of animation resources and audio resources is greater than a preset threshold.

As one implementation, the system resources include at least one of: memory resources, central processing unit (CPU) resources, graphics processing unit (GPU) resources, display resources, network resources, and disk read/write IO (input/output) resources.

Figure 6:
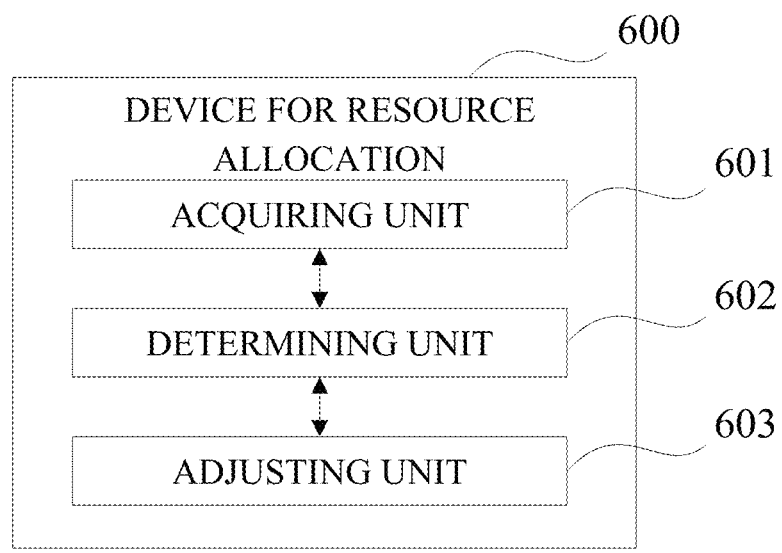
FIG. 6 is a block diagram illustrating functional units of a terminal device according to an implementation of the present disclosure.

FIG. 6 is a block diagram illustrating possible functional units of a device for resource allocation involved in the above implementations. The device 600 includes an acquiring unit 601, a determining unit 602, and an adjusting unit 603.

The acquiring unit 601 is configured to acquire system-state information of a terminal device, where the system-state information is state information of the terminal device that can be detected by an operating system and the terminal device has a target application running in a foreground of the terminal device. The determining unit 602 is configured to determine an internal running scenario of the target application according to the system-state information. The acquiring unit 601 is further configured to acquire a performance improvement strategy corresponding to the internal running scenario. The adjusting unit 603 is configured to adjust allocation of system resources for the internal running scenario according to the performance improvement strategy.

According to the implementation of the disclosure, the operating system of the terminal device first acquires the system-state information of the terminal device, where the terminal device has the target application running in the foreground of the terminal device. The operating system then determines the internal running scenario of the target application according to the system-state information. Thereafter, the operating system acquires the performance improvement strategy corresponding to the internal running scenario. At last, the operating system adjusts the allocation of the system resources for the internal running scenario according to the performance improvement strategy. In the process of running the target application in the foreground, the operating system of the terminal device can accurately identify the internal running scenario of the target application according to the system-state information and acquire the performance improvement strategy corresponding to the internal running scenario, such that the allocation of the system resources for the internal running scenario can be accurately adjusted. In this way, the target application does not need to deliver scenario information to the operating system, thereby reducing signaling overheads between the target application and the operating system and improving refinement and efficiency of adjusting the allocation of the system resources for the target application by the terminal device.

As one implementation, the system-state information includes interaction information. The determining unit 602 configured to determine the internal running scenario of the target application according to the system-state information is configured to identify the internal running scenario of the target application according to the interaction information.

As one implementation, the interaction information includes at least one of: touch parameters of a touch operation on a touch display screen of the terminal device, voice information collected by a microphone of the terminal device, and data information received by the terminal device from a server.

As one implementation, the target application is a game application and the internal running scenario is a team battle scenario. When the interaction information includes the touch parameters of the touch operation on the touch display screen of the terminal device, the determining unit 602 configured to identify the internal running scenario of the target application according to the interaction information is configured to determine that a current internal running scenario of the target application is the team battle scenario, when detecting that at least one of the touch parameters is greater than a preset touch parameter.

When the interaction information includes the voice information collected by the microphone of the terminal device, the determining unit 602 configured to identify the internal running scenario of the target application according to the interaction information is configured to determine that the current internal running scenario of the target application is the team battle scenario when identifying that the voice information contains a preset key field.

When the interaction information includes the data information received by the terminal device from the server, the determining unit 602 configured to identify the internal running scenario of the target application according to the interaction information is configured to determine that the current internal running scenario of the target application is the team battle scenario when identifying that the data information contains association information of a game character.

As one implementation, the system-state information includes a usage state of an internal device of the terminal device. The determining unit 602 configured to determine the internal running scenario of the target application according to the system-state information is configured to identify the internal running scenario of the target application according to the usage state of the internal device of the terminal device.

As one implementation, the internal device includes a microphone.

As one implementation, the target application is a game application and the internal running scenario is a team battle scenario. The determining unit 602 configured to identify the internal running scenario of the target application according to the usage state of the internal device of the terminal device is configured to determine that a current internal running scenario of the target application is the team battle scenario when detecting that a usage state of the microphone is an enabled state.

As one implementation, the system-state information includes usage information of the system resources. The determining unit 602 configured to determine the internal running scenario of the target application according to the system-state information is configured to identify the internal running scenario of the target application according to the usage information of the system resources.

As one implementation, the usage information of the system resources includes a reading speed of disk data, and the disk data includes at least one of animation resources and audio resources. The target application is a game application and the internal running scenario is a team battle scenario. The determining unit 602 configured to identify the internal running scenario of the target application according to the usage information of the system resources is configured to determine that a current internal running scenario of the target application is the team battle scenario when detecting that an increase amount in a reading speed of the at least one of animation resources and audio resources is greater than a preset threshold.

It is to be noted that, the device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The determining unit 602 and the adjusting unit 603 may be a processor or a controller, and the acquiring unit 601 may be a communication interface.

Figure 7:
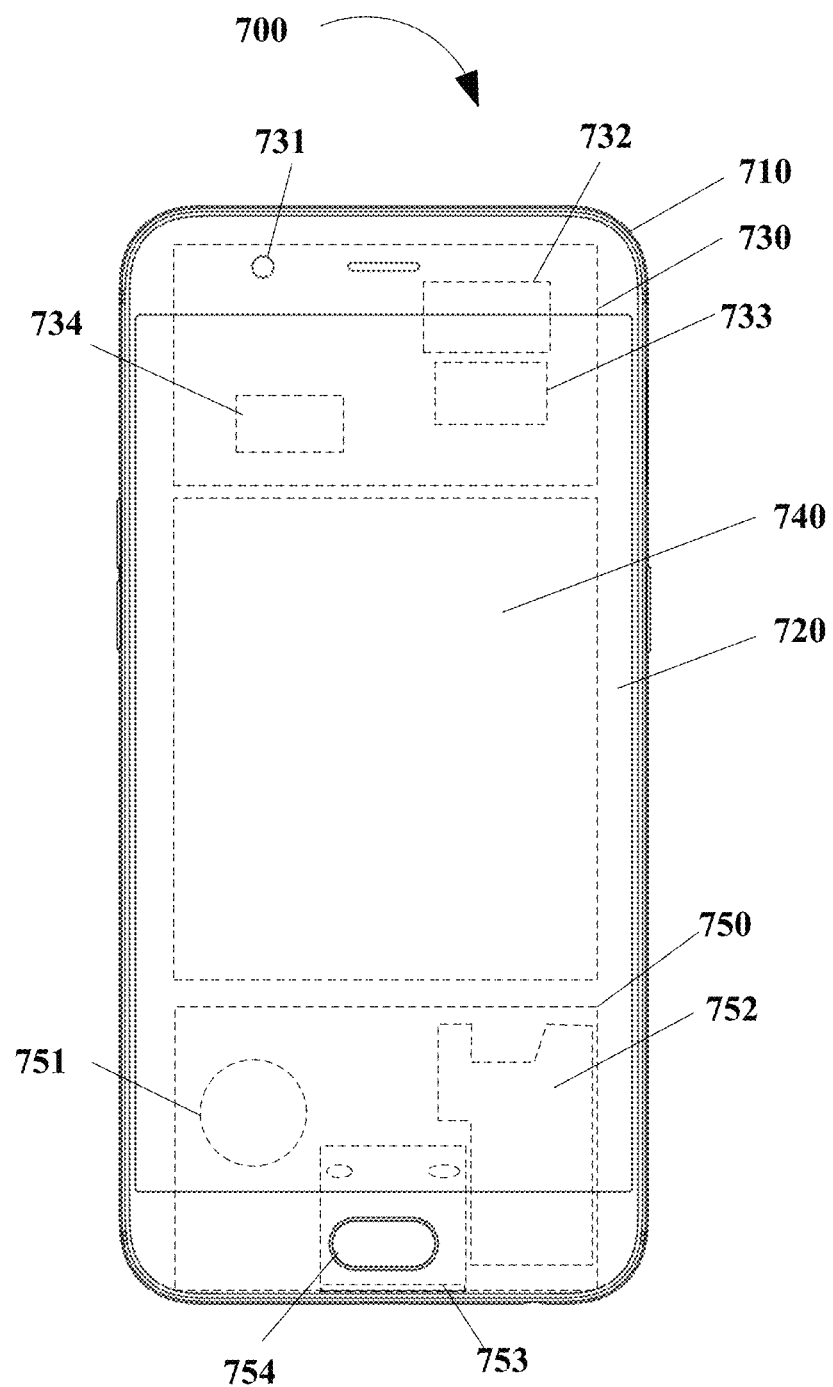
FIG. 7 is a schematic structural diagram illustrating a smart phone according to an implementation of the present disclosure.

FIG. 7 is a schematic structural diagram illustrating a smart phone 700 applicable to the above methods according to an implementation of the present disclosure. The smart phone 700 includes a housing 710, a touch screen 720, a main board 730, a battery 740, and a sub-board 750. The main board 730 is provided with a front camera 731, a processor 732, a memory 733, a power management chip 734, and the like. The sub-board 750 is provided with a vibrator 751, an integrated audio cavity 752, a VOOC flash charging interface 753, and a fingerprint recognition module 754.

The smart phone 700 is configured to acquire system-state information of a terminal device, where the system-state information is state information of the terminal device that can be detected by an operating system and the terminal device has a target application running in a foreground of the terminal device, to determine an internal running scenario of the target application according to the system-state information, to acquire a performance improvement strategy corresponding to the internal running scenario, and to adjust allocation of system resources for the internal running scenario according to the performance improvement strategy.

The processor 732 is the control center of the smart phone and is configured to connect various parts of the whole smart phone through various interfaces and lines, run or execute software programs and/or modules stored in the memory 733, and invoke data stored in the memory 733 to perform various functions of the mobile phone and process data, thereby monitoring the mobile phone as a whole. In at least one implementation, the processor 732 may include one or more processing units. For example, the processor 732 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 732. The processor 732 may be, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination of the terminal device. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

The memory 733 is configured to store software programs and modules, and the processor 732 is configured to execute various function applications and data processing of the mobile phone by running the software programs and the modules stored in the memory 733. The memory 733 mainly includes a program storage area and a data storage area. The program storage area may store an operating system, applications required for at least one function, and so on. The data storage area may store data created according to use of the smart phone, and so on. In addition, the memory 733 may include a high-speed RAM, and may further include a non-transitory memory such as at least one disk storage device, a flash device, or other non-transitory solid storage devices. The memory 733 may be, for example, a random access memory (RAM), a flash memory, a read only memory (ROM), an erasable programmable ROM (EPROM), an electrically EPROM (EEPROM), a register, a hard disk, a mobile hard disk, a compact disc-read only memory (CD-ROM), or any other form of storage medium known in the art.

Implementations of the present disclosure also provide a computer storage medium. The computer storage medium stores computer programs for electronic data interchange which, when executed, are operable with a computer to execute all or part of the operations of any of the methods described in the above-described method implementations. The computer may include a terminal device.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package and the computer may include a terminal device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation, applicable to a terminal device having an operating system and at least one application running in the terminal device, the method comprising:
   acquiring, by the operating system of the terminal device, system-state information of the terminal device, wherein the system-state information is state information of the terminal device that can be detected by the operating system, and the terminal device has a game application running in a foreground of the terminal device, wherein the game application has a present internal running scenario that comprises a team battle scenario and a non-team battle scenario, wherein the system-state information comprises a usage state of a microphone of the terminal device, and wherein the usage state comprises an enabled state and a disabled state;
   determining, by the operating system, that the present internal running scenario of the game application is the team battle scenario when detecting that the usage state of the microphone is the enabled state;
   acquiring, by the operating system, a performance improvement strategy corresponding to the team battle scenario;
   adjusting, by the operating system, allocation of system resources for the team battle scenario according to the performance improvement strategy corresponding to the team battle scenario;
   determining, by the operating system, that the present internal running scenario of the game application is the non-team battle scenario when detecting that the usage state of the microphone is the disabled state;
   acquiring, by the operating system, a performance improvement strategy corresponding to the non-team battle scenario; and
   adjusting, by the operating system, allocation of system resources for the non-team battle scenario according to the performance improvement strategy corresponding to the non-team battle scenario.

2. The method of claim 1, wherein
the system-state information further comprises interaction information; and
determining, by the operating system, the present internal running scenario of the game application according to the system-state information comprises:
identifying, by the operating system, the present internal running scenario of the game application according to the interaction information.

3. The method of claim 2, wherein the interaction information comprises voice information collected by the microphone of the terminal device.

4. The method of claim 3, wherein identifying, by the operating system, the present internal running scenario of the game application according to the interaction information comprises:
   determining, by the operating system, that the present internal running scenario of the game application is the team battle scenario when identifying that the voice information contains a preset key field.

5. The method of claim 1, wherein the system resources comprise at least one of: memory resources, central processing unit (CPU) resources, graphics processing unit (GPU) resources, display resources, network resources, and disk read/write IO (input/output) resources.

6. A terminal device, comprising:
at least one processor; and
a computer readable storage, coupled to the at least one processor and storing at least one computer executable instruction thereon which, when executed by the at least one processor, causes the at least one processor to:
   acquire, by an operating system of the terminal device, system-state information of the terminal device, wherein the system-state information is state information of the terminal device that can be detected by the operating system, and the terminal device has a game application running in a foreground of the terminal device, wherein the game application has a present internal running scenario that comprises a team battle scenario and a non-team battle scenario, wherein the system-state information comprises a usage state of a microphone of the terminal device, and the usage state comprises an enabled state and a disabled state;

determine, by the operating system, that the present internal running scenario of the game application is the team battle scenario when detecting that the usage state of the microphone is the enabled state;

acquire, by the operating system, a performance improvement strategy corresponding to the team battle scenario;

adjust, by the operating system, allocation of system resources for the team battle scenario according to the performance improvement strategy corresponding to the team battle scenario;

determine, by the operating system, that the present internal running scenario of the game application is the non-team battle scenario when detecting that the usage state of the microphone is the disabled state;

acquire, by the operating system, a performance improvement strategy corresponding to the non-team battle scenario; and adjust, by the operating system, allocation of system resources for the non-team battle scenario according to the performance improvement strategy corresponding to the non-team battle scenario.

7. The terminal device of claim 6, wherein
the system-state information further comprises interaction information; and
when executed by the at least one processor, the at least one computer executable instruction causes the at least one processor to determine, by the operating system, the present internal running scenario of the game application according to the system-state information further causes the at least one processor to:
identify, by the operating system, the present internal running scenario of the game application according to the interaction information.

8. The terminal device of claim 7, wherein the interaction information comprises voice information collected by the microphone of the terminal device.

9. The terminal device of claim 8, wherein when the interaction information comprises the voice information collected by the microphone of the terminal device, when executed by the at least one processor, the at least one computer executable instruction causes the at least one processor to identify, by the operating system, the present internal running scenario of the game application according to the interaction information further causes the at least one processor to:
determine, by the operating system, that the present internal running scenario of the game application is the team battle scenario when identifying that the voice information contains a preset key field.

10. A non-transitory computer-readable storage medium storing a computer program which, when executed by a processor, causes the processor to:
acquire, by an operating system of a terminal device, system-state information of the terminal device, wherein the system-state information is state information of the terminal device that can be detected by the operating system, and the terminal device has a game application running in a foreground of the terminal device, wherein the game application has a present internal running scenario that comprises a team battle scenario and a non-team battle scenario, wherein the system-state information comprises a usage state of a microphone of the terminal device, and wherein the usage state comprises an enabled state and a disabled state;
determine, by the operating system, that the present internal running scenario of the game application is the team battle scenario when detecting that the usage state of the microphone is the enabled state;
acquire, by the operating system, a performance improvement strategy corresponding to the team battle scenario;
adjust, by the operating system, allocation of system resources for the team battle scenario according to the performance improvement strategy corresponding to the team battle scenario;
determine, by the operating system, that the present internal running scenario of the game application is the non-team battle scenario when detecting that the usage state of the microphone is the disabled state;
acquire, by the operating system, a performance improvement strategy corresponding to the non-team battle scenario; and
adjust, by the operating system, allocation of system resources for the non-team battle scenario according to the performance improvement strategy corresponding to the non-team battle scenario.

* * * * *